Jan. 24, 1933. J. C. BLAIR 1,895,405
METHOD AND APPARATUS FOR REDUCING A SHEET TO THICKNESS
Filed Feb. 6, 1925
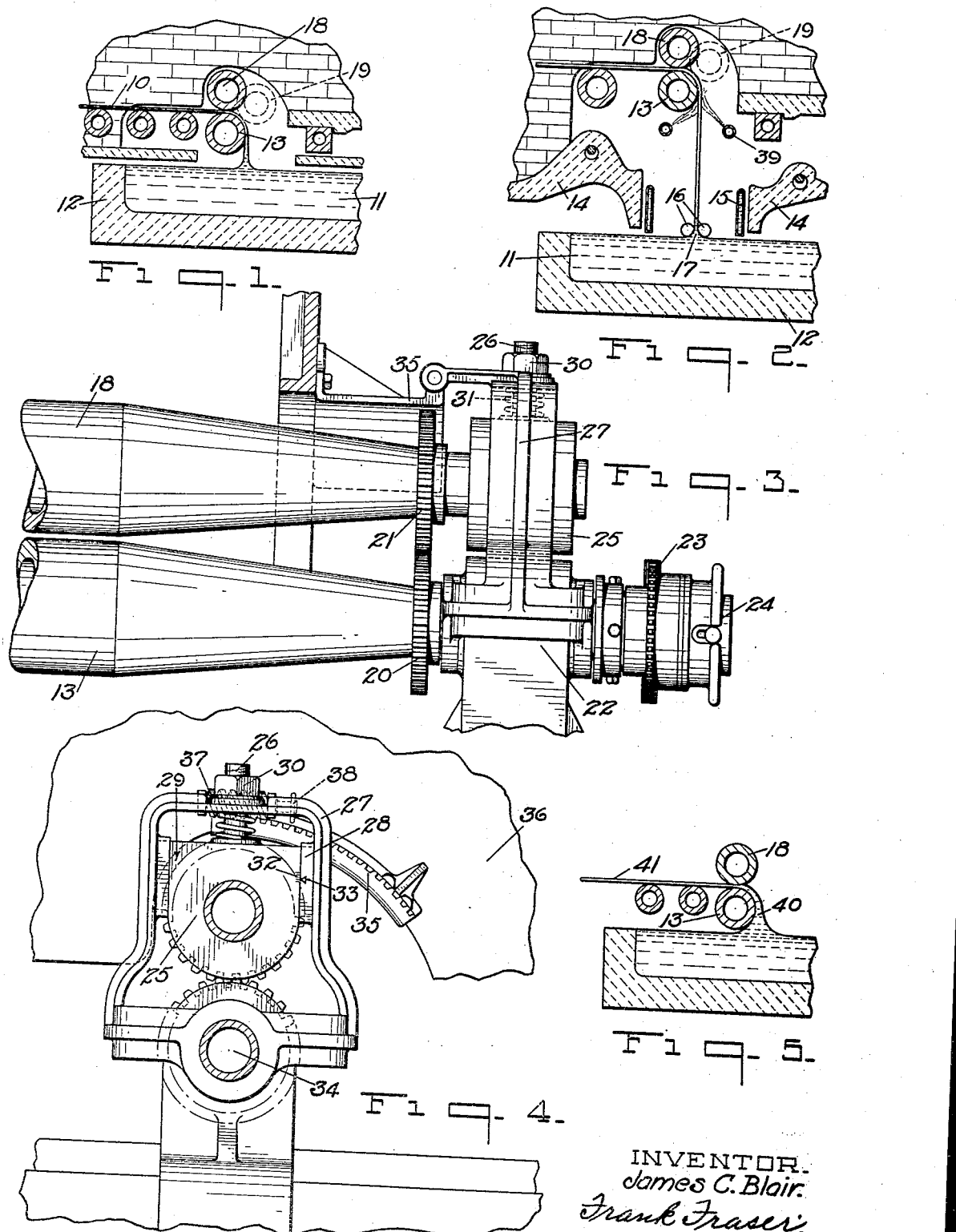
INVENTOR.
James C. Blair.
Frank Fraser
ATTORNEY.

Patented Jan. 24, 1933

1,895,405

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR REDUCING A SHEET TO THICKNESS

Application filed February 6, 1925. Serial No. 7,251.

The present invention relates to a method and apparatus for producing sheet glass, and has particular reference to producing a sheet of glass having a definite and uniform thickness.

An important object of the invention is to provide means for continuously drawing a sheet of glass from a mass of molten glass, and includes means for reducing the sheet to a predetermined and desired thickness.

A further object of the invention is to provide means for continuously drawing a sheet from a mass of molten glass, and includes means for rolling or ironing the sheet to a predetermined thickness before the sheet is set in its final form.

Still another object of the invention is to provide means above a mass of molten glass for creating a sheet forming pass adapted for continuously drawing a relatively thick body of glass from said mass, said body of glass being moved through the sheet forming pass where it is reduced to a sheet having substantially a predetermined thickness.

A still further object of the invention is to provide means for continuously drawing a sheet from a mass of molten glass including rotatable means for deflecting the sheet from one plane to another, and has associated with the deflecting means an arrangement for reducing or ironing the sheet to a predetermined and uniform thickness.

A still further object of the invention is to provide means for producing a uniform flat and smooth sheet of glass which may be particularly well-adapted for use as a blank for plate glass purposes.

Other objects and advantages of the invention will become apparent during the course of the following description.

In the drawing wherein like numerals are employed to designate like parts throughout the same.

Fig. 1 is a fragmentary vertical longitudinal section through one form of apparatus, Fig. 2 is a similar view through a slightly modified form of construction, Fig. 3 is an enlarged detail of my invention, Fig. 4 is an end view showing one form of mounting the supplementary roll used to iron or roll the sheet to the desired thickness, and Fig. 5 shows another form of apparatus for producing sheet glass.

My invention is particularly well-adapted for sheet glass drawing apparatus constructed in accordance with the Colburn Patent No. 1,248,809, granted December 4, 1917, wherein the sheet 10 is continuously drawn from a mass of molten glass 11 contained in a draw-pot 12. In the Colburn machine the sheet is deflected over a so-called bending roll 13, so that the sheet 10 may be run in a horizontal plane over a flattening table and through a suitable annealing leer.

Fig. 2 discloses a portion of the Colburn apparatus and shows the lip-tiles 14, coolers 15, and knurled edge-engaging rolls 16 arranged at the meniscus 17. The bending roll 13 in the Colburn process is arranged at a relatively high distance above the pool of glass 11 so that it is necessary to utilize the edge-engaging knurled rolls 16 to hold or maintain the sheet to width after it is drawn from the pot.

In the present invention I preferably lower the bending roll 13, as is shown in Fig. 1 or Fig. 5.

The thickness of the sheet produced in the Colburn apparatus is determined to a large extent by the rapidity with which the drawing apparatus is operated, thus when the apparatus is operated relatively fast a thin sheet is produced, and vice-versa, when operated slowly a thicker sheet is produced.

It is the aim of the present invention to include means with this type of apparatus wherein the sheet can be reduced to a predetermined and uniform thickness throughout. To accomplish this the sheet is originally drawn slightly thicker than the desired thickness of sheet required, so that it can be reduced in thickness, as has been pointed out. The sheet initially drawn may be considered as a body of glass from which the finished sheet is produced and as having a thickness relatively substantially greater than the thickness of sheet desired.

As is shown in Fig. 1 the bending roll is arranged relatively closer to the mass of molten glass 11 than in Fig. 2, and has associated therewith a supplementary or ironing roll 18 arranged in a manner that the sheet 10 is required to pass between the bending roll 13 and the supplementary or ironing roll 18. The two rolls 13 and 18 thus form a sheet forming pass. The supplementary roll 18 may be mounted in any position relative to the vertical axis or longitudinal axis of the bending roll, as is indicated by the dotted lines 19. The ironing roll or reducing roll 18 may be mounted as shown in Figs. 3 and 4, wherein the bending roll is provided with a gear 20 similar to a gear 21 carried by the supplementary roll and in mesh therewith. The teeth of the gears 20 and 21 are sufficiently long to permit relative adjustment between the two so that the rolls 13 and 18 may be moved to and from each other depending upon the thickness of sheet required.

The bending roll 13 is ordinarily permitted to idle in its bearings 22 and is rotated by the sheet being drawn. In cases of emergency or when starting the sheet, the bending roll 13 is positively driven as through the sprocket wheel and chain 23, which is controlled by a clutch mechanism 24. With the type of construction just described, the bending roll drives the supplementary roll.

The roll 18 is supported in a movable bearing support 25 having connection with the screw-threaded shaft 26, operable through the stationary support or bracket 27. The bracket 27 is provided with guide-ways 28, between which are disposed slides 29, carried by the bearing 25. This permits the bearing 25 to be moved up and down, or to and from the bending roll shaft. A suitable screw-adjusting means 30 is provided for moving the bearing up and down, while a safety spring 31 is provided for permitting the supplementary roll to be moved away from the bending roll in the event a piece of clay or other foreign matter is carried up by the sheet. The spring 31 is however sufficiently strong to hold the ironing roll 18 in its adjustment when no foreign matters are present. Suitable graduations 32 and an index mark 33 are provided to make it possible to ascertain the exact adjustment of the roll 18 with respect to the bending roll. The bracket 27 is preferably rotatably mounted about the shaft 34 so that it can be swung from a vertical position to a horizontal position. A segmental rack 35 is carried by the frame 36, and has engagement with the worm 37, operable by means of the handle 38, by which means the roll 18 and its support can be moved to the desired adjustment.

In Fig. 2 the ironing roll 18 is shown in conjunction with the bending roll 13 as disclosed in the Colburn process, and it is thought advisable to supply heating means 39 for reheating the sheet to permit its reduction in thickness.

In Fig. 5 the roll 13 is disposed very close to the surface of the glass from which the sheet is drawn, thus permitting the sheet supplying meniscus or body of glass 40 to be carried upwardly by the roll as is shown, thus feeding sufficient glass from which the sheet 41 is drawn. The roll 18 prevents any excess glass from passing into the sheet, and insures that an absolute flat and uniform sheet will be produced having a predetermined thickness.

This type of apparatus is particularly well-adapted for producing a sheet of glass suitable for plate glass purposes, and will reduce the amount of grinding and polishing to a minimum as the blank itself is absolutely uniform and flat.

Of course, in those cases where the sheet is to be cut up and used as plate glass, it is desirable to make the blanks slightly larger than the thickness of the desired finished sheet to allow for the removal of a small amount of glass during the surfacing operations.

It is to be understood that the roll 18 can be modified to suit various conditions such as in Fig. 2 where a slightly enlarged edge is formed by the knurled rolls 16. In this instance it is not desirable to flatten or roll these thickened edges. To permit flattening of the sheet proper the roll 18 may be relatively more narrow than the sheet being drawn, or it may be provided with cut-out or reduced portions to permit the knurled edges to be passed between the two rolls without interference.

In the apparatus shown in Figs. 1 and 5, it is not necessary to provide edge-engaging means, thus there will be no necessity for altering the shape of the roll 18. Furthermore this roll may be positively driven instead of its rotation being dependent upon the movement of the sheet.

The sheet may be heated to any desired temperature before it passes between the rolls.

In operation the pot or container 12 is preferably continuously supplied with a mass of molten glass. Arranged above the molten glass is a plurality of rotatable members such as the rolls 13 and 18, which may be positively driven or idled as desired, and which create a sheet forming pass. A sheet or body of glass is conveyed from the mass of molten glass and moved through the sheet forming pass where said body of glass is reduced to a sheet having substantially a predetermined thickness. The sheet thus formed is uniform in thickness, and is well adapted for use as a plate glass blank, in which case the surfaces thereof are ground and polished. It will thus be seen that the sheet or body of glass is relatively thicker before it passes through said sheet forming rolls than afterwards.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims to that feature of the invention directed to the reducing of an unformed mass as distinguished from a preformed sheet are being asserted in my copending divisional application Serial No. 419,271, filed January 8, 1930.

I claim:

1. In sheet glass apparatus, means for drawing a sheet from a mass of molten glass, means for deflecting the sheet from one plane to another, and means coacting therewith to reduce the thickness of the sheet passing therebetween, so that the sheet is relatively thinner after it leaves said means than before.

2. In sheet glass apparatus, means for drawing a sheet from a mass of molten glass, means for deflecting the sheet from one plane to another, and an adjustable roll coacting therewith to reduce the sheet to substantially a predetermined thickness as it passes therebetween so that the sheet is relatively thinner after it leaves said means than before.

3. In sheet glass apparatus, means for drawing a sheet from a mass of molten glass, means for deflecting the sheet from one plane to another, means coacting therewith for reducing the sheet to a predetermined thickness, said last-named means being adjustable relative to said first-named means, and means for indicating the relative adjustment thereof.

4. In sheet glass apparatus, means for drawing a sheet from a mass of molten glass, means for deflecting the sheet from one plane to another, means coacting therewith for reducing the thickness of said sheet as it passes therebetween so that the sheet is relatively thinner after it leaves said means than before, and driving means connecting the deflecting and reducing means.

5. The process of producing sheet glass consisting in drawing a sheet from a mass of molten glass, deflecting the sheet from one plane to another, and then reducing the thickness thereof while being deflected so that the thickness of said sheet subsequent to the deflecting thereof is relatively less than prior thereto.

6. In sheet glass apparatus, a receptacle containing a mass of molten glass, a rotatable member arranged thereover, the molten glass being drawn from said mass and deflected over said rotatable member into a horizontal plane, and a second rotatable member coacting with the first for creating a sheet forming pass through which the glass passes and is reduced to a sheet of substantially predetermined thickness, the glass passing through the sheet forming pass being of less thickness than the glass in advance thereof.

7. In sheet glass apparatus, a receptacle containing a mass of molten glass, a roll arranged above said mass, the molten glass being drawn vertically and deflected over the roll into a horizontal plane, a second roll coacting with the first to create a sheet forming pass for reducing the molten glass to a sheet having a predetermined thickness, the distance between the rolls being less than the thickness of the mass of glass passing thereto, and means for positively driving said rolls.

8. The process of producing sheet glass, consisting in drawing a mass of molten glass vertically and shaping it into sheet form, deflecting the sheet into a substantially horizontal plane, and in effecting an actual reduction in the thickness of said sheet during the deflecting thereof so that said sheet is thinner, subsequent to its deflection, than prior thereto.

9. The process of producing sheet glass, consisting in drawing a mass of molten glass upwardly and shaping the mass into a sheet of relatively greater thickness than that desired of the finished sheet, deflecting the relatively thick sheet into a substantially horizontal plane and passing it through a forming pass, and in maintaining the width of the forming pass less than the thickness of the sheet passing thereto so as to effect an actual reduction in the thickness of the sheet as it passes therethrough.

10. The process of producing sheet glass, consisting in drawing a mass of molten glass upwardly and shaping the mass during its upward movement into a sheet of relatively greater thickness than that desired of the finished sheet, deflecting the relatively thick sheet into a substantially horizontal plane and passing it through a forming pass created between two movable surfaces, and in maintaining the width of the pass less than the thickness of the preformed sheet passing thereto so that when the sheet issues from said pass it is of less thickness than in advance thereof.

11. In sheet glass apparatus, a receptacle containing a mass of molten glass, a pair of rotatable members positioned in substantially vertical alignment for drawing a sheet upwardly therebetween from the molten mass, deflecting it into a substantially horizontal plane, and reducing it to a substantially predetermined thickness, said members being spaced to create a forming pass therebetween which is of less width than the thickness of the glass passing thereto.

12. In sheet glass apparatus, a receptacle containing a mass of molten glass, a roll arranged above the molten glass for drawing a sheet of glass upwardly therefrom and deflecting it into a substantially horizontal plane, a roll positioned opposite to and coacting with the first roll to effect an actual reduction in the thickness of the preformed sheet passing therebetween so that the sheet formed by the coaction of said rolls is less than the thickness of the glass supplied to said rolls.

13. In sheet glass apparatus, a receptacle containing a mass of molten glass, a roll arranged above the molten glass for drawing a sheet of glass upwardly therefrom and shaping it during its upward movement into a sheet of relatively greater thickness than that desired of the finished sheet, said sheet being deflected over said roll into a substantially horizontal plane, a second roll positioned opposite to and coacting with the first roll to effect an actual reduction in the thickness of the sheet during the deflecting thereof so that the sheet issuing from between the rolls is of less thickness than the preformed sheet passing thereto.

Signed at Toledo, in the county of Lucas and State of Ohio, this 2nd day of February, 1925.

JAMES C. BLAIR.